E. W. MAHONE.
HORSE COLLAR.
APPLICATION FILED MAY 19, 1919.

1,316,170.

Patented Sept. 16, 1919.
2 SHEETS—SHEET 1.

Inventor
E. W. Mahone

By Jack A. Ashley

Attorney

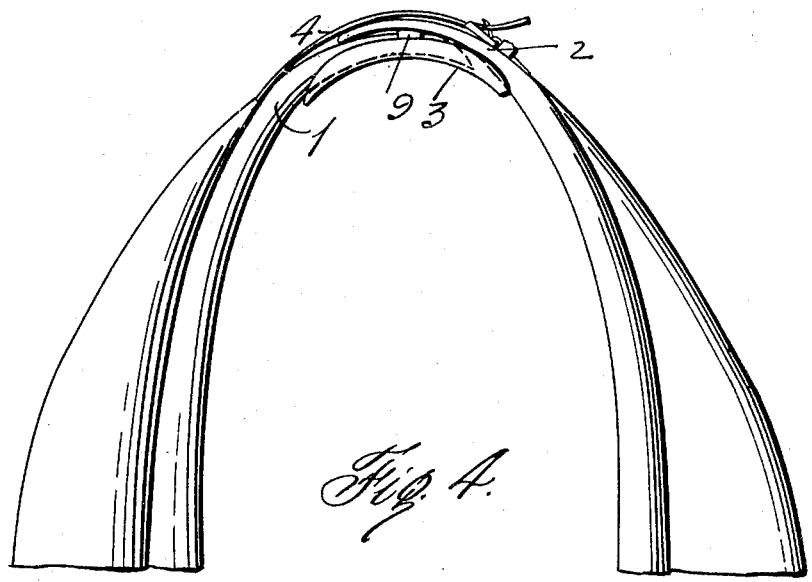
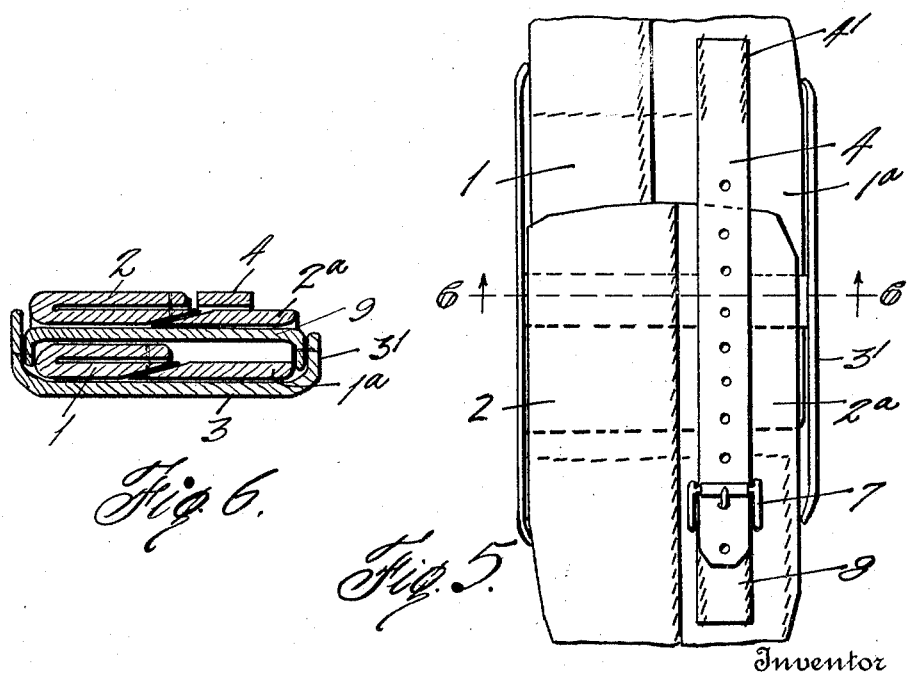

UNITED STATES PATENT OFFICE.

EDWIN W. MAHONE, OF MARSHALL, TEXAS.

HORSE-COLLAR.

1,316,170.      Specification of Letters Patent.      Patented Sept. 16, 1919.

Application filed May 19, 1919. Serial No. 298,078.

*To all whom it may concern:*

Be it known that I, EDWIN W. MAHONE, a citizen of the United States, residing at Marshall, in the county of Harrison and State of Texas, have invented certain new and useful Improvements in Horse-Collars, of which the following is a specification.

This invention relates to harness collars for horses, mules and the like.

The invention has particularly to do with improvements on the collar covered by the Letters Patent issued to me January 2, 1917, No. 1,211,207.

One of the improvements resides in a pad covering the inside of the joint where the upper ends of the collar overlap thus doing away with the metal clips. Another improved feature of the invention is the arrangement of a single adjustable fastening strap. The improved collar is much more simple and is believed to be more comfortable.

Figure 1:
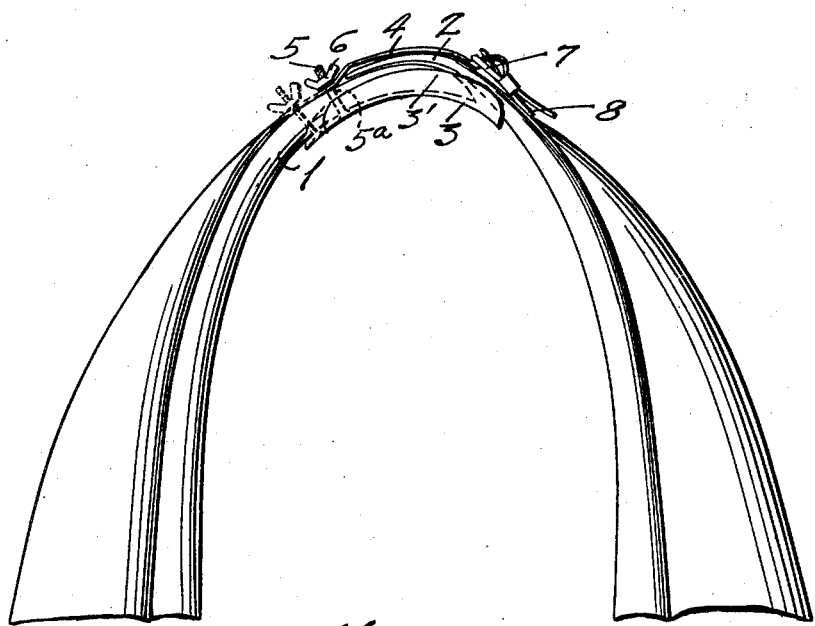
Figure 3:
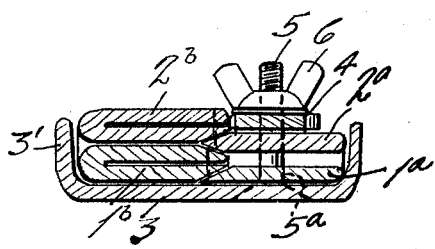
Figure 2:
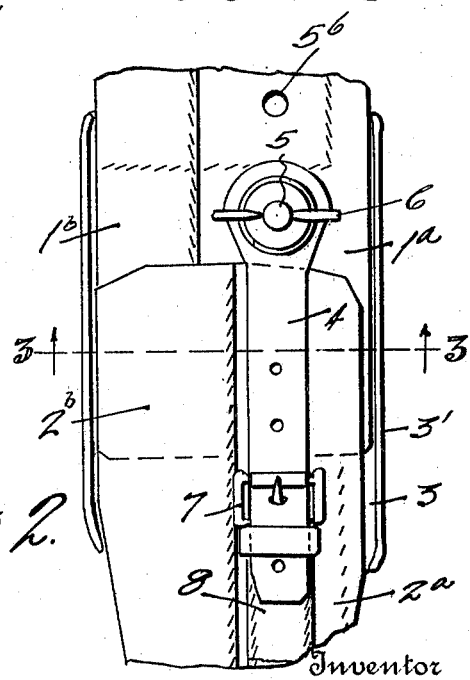

The invention will be more readily understood from a reading of the following specification and by reference to the accompanying drawings, in which an example of the invention is shown and wherein:

Figure 1 is an elevation of the end portions of the collar constructed in accordance with the invention, Fig. 2 is a plan view of the same, Fig. 3 is a cross-sectional detail on the line 3—3 of Fig. 2, Fig. 4 is an elevation of the ends of a modified form of collar, Fig. 5 is a plan view of the same, and Fig. 6 is a cross-sectional detail on the line 6—6 of Fig. 5.

In the drawings the numeral 1 designates one of the upper ends of a horse collar and 2 the other end which overlaps onto the end 1. The end 1 has one side designated by the reference numeral $1^b$ doubled and the other side $1^a$ formed of a single thickness of leather. The end 2 has a double portion $2^b$ and a single portion $2^a$.

A pad 3 has its side edges $3'$ turned upward. The pad fits in the collar under the overlapping ends and the sides cover the side edges of the said ends thus protecting the neck of the animal and making a smooth connection.

A fastening strap 4 has one end penetrated by a bolt 5. The bolt is countersunk in the under or inner side of the pad and passed through an aperture $5^a$ in the part $1^a$. The strap lies over the part $2^a$ of the end 2 and is held on the bolt by a wing nut 6.

The free end of the strap engages a buckle 7 fastened to the end 2 by a top 8. The usual holes in the strap provide a limited adjusting whereby the ends of the collar may be fastened according to the size of the neck of the animal. A smaller range of adjustment may be had by removing the bolt 5 and placing it in an aperture $5^b$ spaced further down on the collar. The strap lying on the single portions of the ends obviates a bulky projection on top of the collar and the doubled portions avoid the use of two straps. There are no plates, pins or clips and the pad 3 may be soft and flexible.

In Figs. 4, 5 and 6 I show a modified form in which the pad is provided with a loop 9 of leather or other suitable material. This loop engages over the end 1 under the overlapping end 2 and serves to support the pad and permits the latter to be adjusted as the collar is enlarged or reduced. The strap 4 is fastened to the end 1 by stitches $4'$ instead of the bolt 5. Otherwise the parts are the same.

It is pointed out that the ends 1 and 2 and the pad are soft and pliable making a very easy and comfortable joint capable of an ample range of adjustment to suit different animals.

What I claim, is:

1. A horse collar having overlapping ends, a flexible pad fitting under the said ends, means for adjustably supporting the pad on one of the ends, a fastening strap attached to one of the ends, and a buckle carried by the other collar end receiving the strap.

2. The combination with a horse collar having overlapping ends, said ends having longitudinally reduced portions, a flexible pad fitting under the overlapping ends and adjustable to conform to the expansion or contraction of the collar, a fastening strap attached to the reduced portion of one collar end and overlying the other reduced portion, and a buckle attached to the reduced portion of the other collar end and receiving the strap.

In testimony whereof I affix my signature.

EDWIN W. MAHONE.

Copies of this patent may be obtained for five cents each, by addressing the "Commissioner of Patents, Washington, D. C."